United States Patent [19]

Göttert et al.

[11] 4,367,407

[45] Jan. 4, 1983

[54] METHOD FOR CONVERTING LUMINOSITY VALUES INTO ISOCHROMATES

[75] Inventors: Hans W. Göttert, Lage; Rainer Schiffer, Cologne, both of Fed. Rep. of Germany

[73] Assignee: Bayer Aktiengesellschaft, Leverkusen, Fed. Rep. of Germany

[21] Appl. No.: 35,757

[22] Filed: May 3, 1979

Related U.S. Application Data

[63] Continuation of Ser. No. 848,797, Nov. 4, 1977, abandoned.

[30] Foreign Application Priority Data

Nov. 24, 1976 [DE] Fed. Rep. of Germany ....... 2653419

[51] Int. Cl.³ ............................................. G03B 21/00
[52] U.S. Cl. ..................... 250/329; 250/331
[58] Field of Search .............. 250/271, 316, 317, 318, 250/329, 331; 350/330, 351, 352; 356/71

[56] References Cited

U.S. PATENT DOCUMENTS

| | | | |
|---|---|---|---|
| 3,114,836 | 12/1963 | Fergason et al. | 250/331 |
| 3,133,194 | 5/1964 | Watson et al. | 250/329 |
| 3,331,688 | 7/1967 | Altman | 250/329 X |
| 3,401,262 | 9/1968 | Fergason et al. | 250/331 |
| 3,438,022 | 4/1969 | Teeg et al. | 250/329 X |
| 3,666,948 | 5/1972 | Mechlowitz et al. | 250/331 |

*Primary Examiner*—Davis L. Willis
*Attorney, Agent, or Firm*—Sprung, Felfe, Horn, Lynch & Kramer

[57] ABSTRACT

Luminosity values of a structure carrying information, in particular grey scale values, are transformed into corresponding isochromates. The transformation is effected by optically imaging the information carrying structure onto a layer of liquid crystals. By this means, a thermogram corresponding to the information carrying structure produced in the layer of liquid crystals, so that the luminosity values of the structure carrying information is transformed into isotherms in the layer of liquid crystals, and the isotherms are converted into isochromates as a result of the colour/temperature behaviour of the layer of liquid crystals.

9 Claims, 5 Drawing Figures

METHOD FOR CONVERTING LUMINOSITY VALUES INTO ISOCHROMATES

This is a continuation of application Ser. No. 848,797, filed Nov. 4, 1977, now abandoned.

The invention relates to a method of converting luminosity values of a structure carrying information into isochromates corresponding to the luminosity values. The method is particularly suitable for converting grey scale values of photographic negatives on transparent base films into an equivalent colour scale.

The human eye can only distinguish imperfectly between different luminosities. On the other hand, the capacity for distinguishing colours is very well defined. If the luminosity values of a picture which is only characterised by grey scale values are transformed into corresponding different colours, a substantially greater contrast and thus more precise subjective perception is obtainable during observation.

This fact is exploited in the known equidensity technique. In this technique, black and white pictures are transformed into colour pictures. Certain grey scale values are allocated to certain colours by means of a corresponding chromophore developing method. A more detailed description of the equidensity technique is to be found, for example, in the journal "Bild der Wissenschaft" 3, pages 230-239, 1973. The method has proved mainly useful for scientific and technical purposes.

In the present invention, in contrast to the equidensity technique, the conversion of luminosity values of a structure carrying information into a corresponding colour scale is not however achieved by photochemical means but directly with physical means.

The term "luminosity values" is to be understood in this context as including not only the grey scale values of a black and white scale, but also the luminosity gradations of a colour.

According to the invention there is provided a method of converting luminosity values of an information carrying structure into isochromates corresponding to the luminosity values, wherein the information carrying structure is optically imaged on a layer of liquid crystals and a thermogram corresponding to the information carrying structure is produced in the layer of liquid crystals in which the luminosity values of the information carrying structure is transformed into isotherms, and the isotherms are converted into isochromates as a result of the colour/temperature behaviour of the layer of liquid crystals.

The information carrying structure is preferably brought into contact with a transparent layer of liquid crystals and is illuminated through the layer of liquid crystals. An optical image is thus formed by contact printing.

As an alternative, an optical image may be formed with the aid of a lens system connected between the information carrying structure and the layer of liquid crystals applied to an absorbent base film.

The same light source is advantageously used both for visual observation of the layer of liquid crystals and to produce the optical image. However, if the optical image is formed with the aid of a lens system, then another light source may be used for visual observation of the layer of liquid crystals. The image light source may then be, for example, a pure infrared light source, while a white light source, for example daylight, is used for observing the layer of liquid crystals. The range of isochromates allocated to the luminosity values may be controlled by the use of filters and/or polarizers connected in the path of the rays. In this way, the colour scale may be adapted to the luminosity values of the information carrier. It is, however, considerably easier to shift the isochromate range by altering the intensity of illumination in the region of the layer of liquid crystals. The illumination intensity may be varied, for example, by altering the distance between the light source for the optical image and the layer of liquid crystals.

The method according to the invention provides the following advantages:

1. The conversion of luminosity values into corresponding isochromates does not require a photochemical process. Rather, the isochromates may be made visible directly. If it is desired to record the result, the colour picture may be photographed by conventional colour photography.

2. The allocation of the colour scale to particular luminosity values can be varied. It is not necessary to keep to a particular allocation, once selected. Rather, the isochromate range may be optimized empirically during observation of the colour picture.

3. Since the method according to the invention is purely physical, material is not used up. More specifically, the layer of liquid crystals is re-usable.

4. The method according to the invention is not limited to the transfer of density values into a corresponding colour scale. Instead the information carrying structure may be amplitude modulated in a chosen wavelength range, in other words, it has points of different absorption. A stationary invisible heat picture is formed during exposure of such an amplitude structure to radiation. This heat picture is then converted by the colour/temperature behaviour of the layer of liquid crystals into a colour picture.

The layer of liquid crystals used in the method according to the invention preferably consists of encapsulated cholesteric mesophases which are embedded in a suitable binder, for example, polyvinyl alcohol. The production and the properties of such encapsulated liquid crystals are described in detail in the literature (see for example U.S. Pat. Nos. 3,441,513 and 3,732,119).

The invention is described in more detail below with reference to the accompanying drawings, in which.

Figure 1:
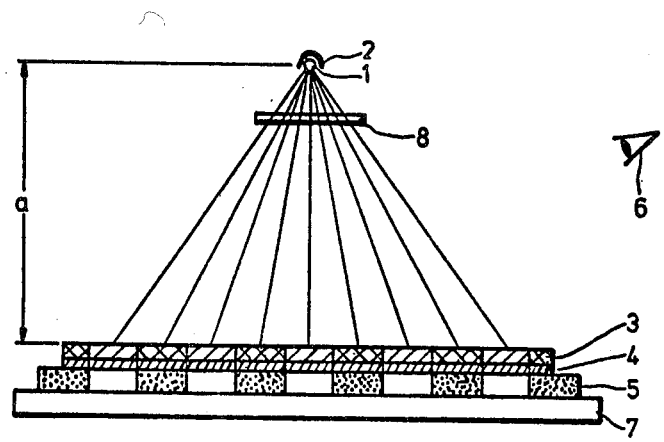
FIG. 1 shows a simple arrangement for converting luminosity values into isochromates by contact printing.

If an X-ray negative is exposed to radiation from a light source, then the absorption of the electromagnetic radiation causes the negative to be heated. This heating is a function both of optical properties, in particular the absorption of the negative, and of the spectral composition of the radiation. In principle, the darker areas of the picture will be heated more than the transparent areas. If a layer of liquid crystals is brought into contact with the X-ray negative, these temperature variations will be transferred to the layer of liquid crystals. The distribution of temperature produced in the layer of liquid crystals in this way causes a wavelength-selective reflection in this layer, which produces a colour impression corresponding to the black and white photographic picture.

The layer of liquid crystals is applied to a transparent carrier, for example a translucent film in the form of microencapsulated, cholestric mesophases dispersed in a binder. Significant heating does not take place owing to the optical transparency of the layer of liquid crystals and the carrier. For this reason, the mechanical contact with the information carrier (f.e. an X-ray negative) may be produced before illumination takes place. When the light source is switched on, a colour pitcture is formed immediately. The colour scale produced by the temperature-sensitive, spectral selection of the liquid crystals may be allocated to different range of grey scale values by changing the illumination in the region of the layer of liquid crystals.

An arrangement which is suitable for this purpose is described with reference to FIG. 1. Light from a radiation source 1 (for example an incandescent lamp having a power of from 200 to 500 watts) is formed by a reflector 2 into divergent beam of light which passes through a layer of liquid crystals 3 on a transparent carrier 4 into an X-ray negative 5 thereunder. The intensity of illumination in the region of the layer of liquid crystals 3 is substantially uniform.

The electromagnetic radiation absorbed in the X-ray negative 5 produces a heating effect which varies according to the optical density. The layer 3 of microencapsulated, cholesteric liquid crystals applied to the transparent carrier foil 4, which may, for example, be a Terphane foil (Terphane is a Registered Trade Mark) having a thickness of 5.6 μm, makes good heat contact with the X-ray negative 5. The heat image of the X-ray negative 5 is thus transferred to the layer of liquid crystals 3. A coloured image corresponding to the heat image is formed in the layer of liquid crystals. The absorption of the radiation transmitted by the liquid crystals required for producing the colour effect is produced in the X-ray negative 5, the average optical density of which is sufficient for this purpose. An additional reflecting thermally insulating film 7 may be provided on the free side of the X-ray negative 5 in order to improve the colour image perceived by the observer 6.

Figure 2:
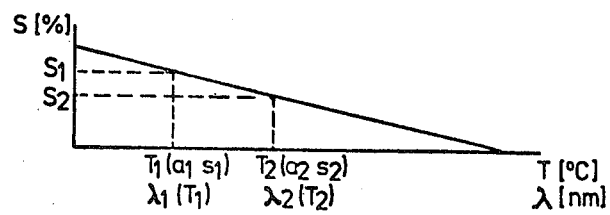
FIGS. 2 and 3 shows the graphical interrelationship between the absorption (optical density) of the information carrier and the isotherms and isochromates which result from the image thereof.
Figure 3:
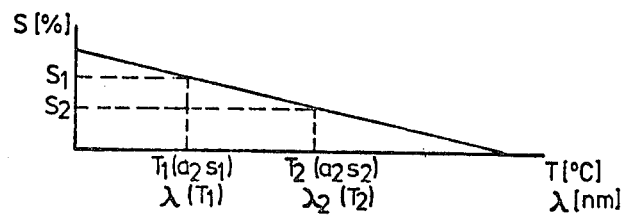

Suitable filters and/or polarizers 8 may be placed in the path of the rays in order to provide a wave-length-selective and/or polarizing effect. In this way the isochromate range may be shifted. A simpler way of shifting the isochromate range is to vary the intensity of irradiation in the layer of liquid crystals 3 by varying the distance a between the light source 1 and the layer of liquid crystals 3. For a predetermined intensity $J(a)$, the temperature is $T(a,S)$ where S is the optical density. For two different optical intensities $S_1$, $S_2$ (for example, $S_1=60\%$, $S_2=40\%$), temperatures $T_1(a_1, S_1)$ and $T_2(a_1, S_2)$ are produced at constant $a=a_1$ (see FIGS. 2 and 3). The light radiated from the layer of liquid crystals 3 passes through the red to blue range of wave-lengths (for example, $\lambda_2^{red}=650$ nm, $\lambda_1^{blue}=380$ nm at the temperature range $T_1-T_2=\Delta T=1.7°$ C. and $T_2=31°$ C. (red point)). The temperature range $\Delta T$ and thus the colour range $\Delta\lambda=\lambda_2-\lambda_1$ may be produced in the image various optical density intervals $\Delta S=S_1-S_2$ by varying a.

Figure 4:
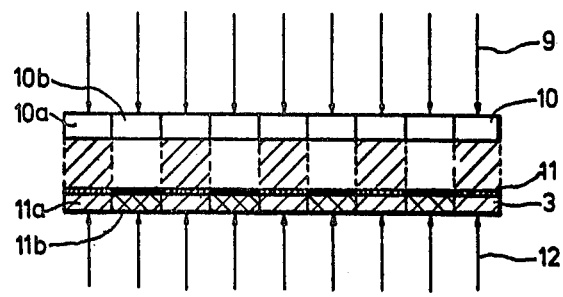
FIG. 4 shows the conversion of luminosity values into isochromates, using parallel light and observing the layer of liquid crystals from the rear.

In the embodiment shown in FIG. 4 in contrast to that shown in FIG. 1, the structure 10 carrying the information does not consist of areas of varying optical density on an otherwise transparent background, but of areas which effect absorption in a specific spectral range. These areas thus act as filters for the electromagnetic radiation 9 which in this case is a parallel beam. The structure 10 carrying the information accordingly represents an amplitude structure as in the first example, but in this case the amplitude modulation is effective in a specific spectral range. A strongly absorbent black layer 11 is arranged at a short distance (about 1 to 2 mm) behind the information carrying structure 10, and the layer of liquid crystals 3 is applied to the rear of the black layer 11. The information modulation transmitted portion of the incident radiation produces a negative picture of the information carrying structure as a heat image in the absorbent black layer 11. An area of stronger absorption 10a in the structure carrying the information produces a lower intensity of radiation in the black layer 11 than an area of lesser absorption 10b. The temperature of the area 11a is thus less than the temperature of the area 11b in the black layer 11. In this case, the black layer 11 is a black coloured film which is coated with liquid crystals. The liquid crystals thus make direct heat contact with the black layer 11.

The rear, that is to say the side of the layer of liquid crystals 3 facing away from the black layer 11 is illuminated with white light, for example daylight 12. The observer 6 then sees a colour picture corresponding to the information carrying structure against the background of the black layer. This embodiment is particularly useful when the areas 10a of the structure carrying the information and absorbent to radiation in an invisible region of the spectrum for example infrared In this case care must be taken to ensure that the image forming light 9 has sufficiently strong portions in this region of the spectrum.

Figure 5:
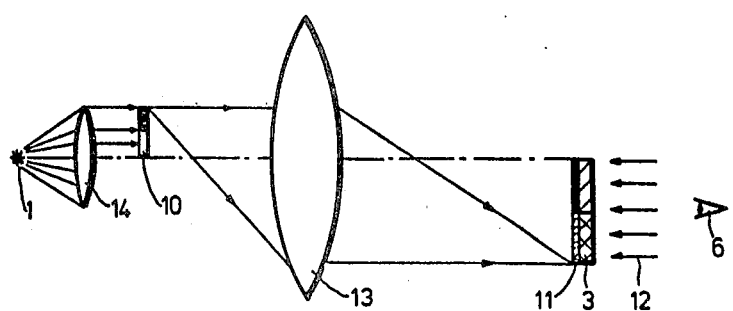
FIG. 5 shows the formation of an image of the information carrying structure on the layer of liquid crystals with the aid of lenses, the layer of liquid crystals again being observed from the rear.

The arrangement in FIG. 5 is similar in principle to the one just described. The information carrying structure 10 again consists of a wave-length-selective amplitude structure. The layer of liquid crystals 3 is, as described above, applied to a black layer 11 and is observed from the side facing away from the information carrying structure 10. The imaging of the information carrying structure 10 does not however take place with parallel light but with the aid of a lens 13. For this purpose, the structure carrying the information is illuminated with parallel light coming from condensor 14. This arrangement has the advantage of allowing a reduced or enlarged image of the information carrying structure to be produced on the black layer 11. As described with reference to FIG. 1, the colour range $\Delta\lambda$ may also be shifted in this case by varying the illumination.

What we claim is:

1. A method of converting optical density values of graded scale information on a transparency into different isochromates corresponding to the different density values comprising: providing a transparency having graded scale information thereon; producing a multicolor image in a liquid crystal layer corresponding to the information of the transparency by directing a radiation beam from an external radiation source onto the transparency to produce a thermogram in the transparency with a given temperature value corresponding to each optical density value of the graded scale and imparting the thermogram to the liquid crystal layer to produce a multi-color image therein corresponding to the thermogram and thereby the information of the transparency; and displaying the resulting multi-color image of the liquid crystal layer for observation.

2. A method according to claim 1, wherein the step of producing comprises bringing the transparency into contact with a transparent layer of liquid crystals and illuminating the transparency through the layer of liquid crystals with the radiation beam.

3. A method according to claim 1, wherein the step of producing comprises applying the layer of liquid crystals to an absorbent base film and imaging the transparency on the liquid crystal layer by a lens system located between the transparency and the layer of liquid crystals.

4. A method according to claim 3, further comprising providing one light source for producing the thermogram and a different light source for visual observation of the layer of liquid crystals.

5. A method according to claim 4, wherein the transparency is imaged on one of a reduced or enlarged scale.

6. A method according to claim 1, wherein the step of producing comprises providing a single light source for visual observation of the layer of liquid crystals and for producing the thermogram.

7. A method according to claim 1, further comprising providing at least one of filters and polarizers located in the path of the radiation to adjust the range of resulting colors.

8. A method according to claim 1, further comprising changing the illumination in the region of the layer of liquid crystals to adjust the range of resulting colors.

9. A method according to claim 8, wherein the illumination is changed by altering the distance between the external radiation source for the imaging and the layer of liquid crystals.

* * * * *